Dec. 16, 1952   K. B. THOMPSON   2,621,623
SIGNALING DEVICE
Filed April 18, 1944
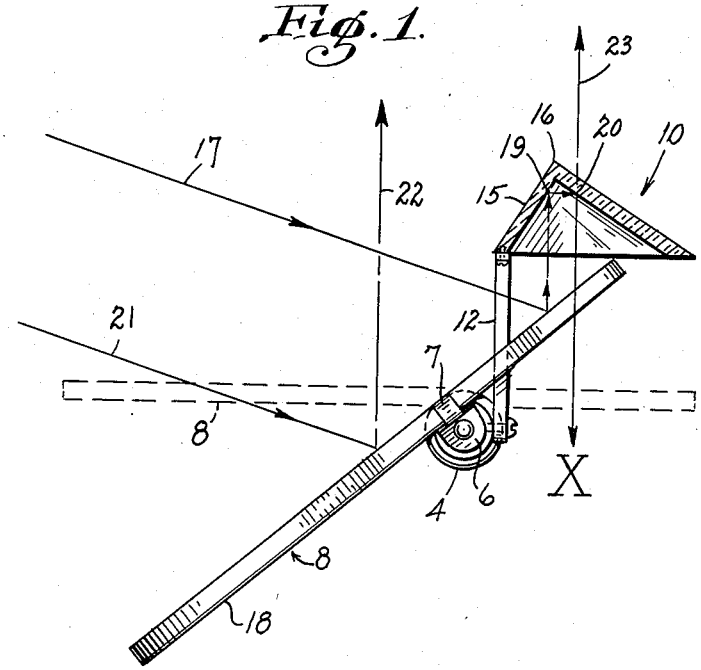
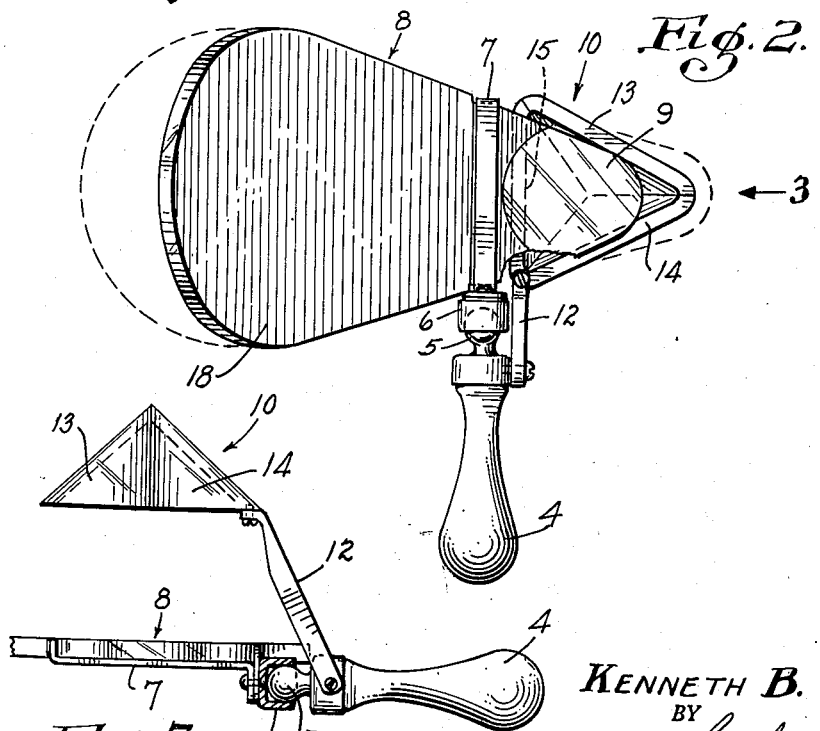
INVENTOR.
KENNETH B. THOMPSON
BY Carlos G. Stratton
ATTORNEY.

Patented Dec. 16, 1952

2,621,623

UNITED STATES PATENT OFFICE 2,621,623

SIGNALING DEVICE

Kenneth B. Thompson, Sierra Madre, Calif.

Application April 18, 1944, Serial No. 531,564

1 Claim. (Cl. 116—20)

My invention relates to a signaling device, and more particularly to a means for utilizing the sun's rays to signal to a distant point.

At the present time when a pilot is shot down or has to land because of mechanical or other difficulties, and attempts to signal to, or attract the attention of a passing plane with a reflecting means, such as a mirror, he has considerable difficulty in determining whether the rays are actually being reflected toward the passing aircraft. It is the primary object of the present invention to provide means whereby a person may know that he is reflecting the sun's rays directly upon a distant object.

It is a further object of the present invention to provide a device having sighting and reflecting means that is compact and light in weight, and may be carried by every pilot for emergency purposes.

My invention also has for its objects to provide such means that are positive in operation, convenient in use, easily and quickly operated, economical of manufacture, simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a plan view of an embodiment of the foregoing objects.

Fig. 2 is a side elevation of said embodiment, looking into the device as a user would do.

Fig. 3 is a side elevation, looking in the direction of the arrow 3 of Fig. 2.

Referring more in detail to the drawings, the reference number 4 indicates a handle which carries a ball 5, which in turn engages a socket 6, in order to provide a universal connection. Upon the socket 6 is mounted a clamp 7 for a mirror 8. The mirror 8 is silvered on its rear surface, as shown at 18, except for a window 9 which is provided by omitting the silvering from a portion of the glass of the mirror 8.

A sighting element 10 is also mounted upon the handle 4 by means of an arm 12. The sighting element 10 comprises three transparent sides 13, 14 and 15 arranged at 90° angles to each other. The sighting element 10 may either be a single molded piece of transparent plastic whose three faces are at 90° angles to each other, or it may be three panes of plate glass arranged at 90° angles to each other.

In the use of my device, the handle is, of course, held in the user's hand. The user looks into the sighting element 10, say, from the point X in Fig. 1, so that the sighting element is substantially normal with the user's eye. The apex 16 of the sighting element is pointed generally toward the object being sighted, such as an aircraft in flight. It will be noted that the clear portion 9 of the glass plate is between the point X and the sighting element 10. With the user looking through the clear portion 9 into the sighting element, he adjusts the mirror by tilting or swinging it by means of the ball and socket joint, until an image of the sun can be seen in the sighting element. The broken lines 8 in Fig. 1 indicate another position of the mirror.

The sun's rays 17 are reflected by the clear portion 9 onto one of the faces inside the sighting element 10, as indicated at 19, then this transparent surface reflects the sun's rays to a point 20 on another inner face in the sighting element 10. Thus, we have three reflections of the sun's rays by transparent material, so that the image of the sun that the user can see reflected from the point 20 is relatively weak so as not to strain the user's eye.

The next step in the use is to superimpose the image of the sun, which the user sees in the sighting element 10, upon the aircraft in flight or other distant object. With the object some distance away, the image of the sun is larger than that of the aircraft, so that this superimposing of the image of the sun upon the aircraft can be done without difficulty. If the object were close, the sun's rays could be reflected upon the part of the object desired.

With the present device in such image-superimposing position, the user knows that the rays 21 of the sun are being reflected, as shown at 22, by the silvered portion 18 of the mirror, upon the aircraft, since the line of sight 23 and the reflected sun's rays 22 are parallel and close together. Of course, the entire silvered surface 18 of the mirror will reflect sun's rays directly to the aircraft, thus attracting the pilot's attention. The sun's rays 17 and 21 shining upon the different portions of the glass of the mirror 8 are also parallel.

It is believed clear without further illustration that the handle 4, ball and socket joint 5 and 6, clamp 7 and arm 12 may be omitted and the mirror 8 and sighting element 10 held in the user's hands.

Moreover, it is believed clear that by intercepting the sun's rays 22, or oscillating the mirror, the user could spell words by Morse Code.

In practice, the ball and socket joint 5 and 6 permits universal adjustment of the mirror in order to be able to reflect the sun's rays into the sighting element and upon the distant object as explained.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claim.

Having thus described my invention, what I claim and desire to secure by Letters Patent is:

A signalling device designed for free manipulation with reference to a moving target, comprising a support, a mirror thereon and adapted to receive light from a distant source in order to project the light on the target and provided with a window, a reflecting surface operatively opposed to said mirror, and a retro-directive reflector on said support and adjustable to a series of operative positions with respect to said opposed reflecting surface.

KENNETH B. THOMPSON.

REFERENCES CITED

The following references are of record in the file of this patent:

FOREIGN PATENTS

| Number | Country | Date |
|---|---|---|
| 9,129 | Great Britain | Apr. 22, 1903 |
| 117,760 | Australia | Nov. 10, 1943 |

OTHER REFERENCES

General Electric Review, May 1944.

Jungle, Desert, Arctic Emergencies, U. S. Army Air Forces. Flight Control Command, Safety Education Div.